United States Patent [19]

Henson et al.

[11] 4,276,358

[45] Jun. 30, 1981

[54] ELECTRIC BATTERIES

[75] Inventors: Kenneth Henson, Bury; Christopher Terrell, London, both of England

[73] Assignee: Chloride Group Limited, London, England

[21] Appl. No.: 124,516

[22] Filed: Feb. 25, 1980

[30] Foreign Application Priority Data

Mar. 7, 1979 [GB] United Kingdom ............. 08034/79

[51] Int. Cl.³ ............................................. H01M 2/04
[52] U.S. Cl. ...................................... 429/97; 429/163; 429/177
[58] Field of Search .................... 429/97, 96, 159, 163, 429/177, 100, 99

[56] References Cited

U.S. PATENT DOCUMENTS

| | | |
|---|---|---|
| 1,743,540 | 1/1930 | Gosmann et al. ................ 429/163 |
| 1,756,072 | 4/1930 | Smith ...................................... 429/54 |
| 1,757,889 | 5/1930 | Wheat .............................. 429/163 X |
| 2,713,603 | 7/1955 | Weber ................................... 429/54 |
| 3,370,988 | 2/1968 | Morton ................................. 429/97 |
| 3,542,603 | 11/1970 | Simon .................................... 429/97 |
| 3,897,268 | 7/1975 | Haraguchi ........................... 429/97 |
| 3,963,972 | 6/1976 | Todd ..................................... 429/97 |
| 4,121,017 | 10/1978 | Dougherty et al. ............. 429/177 X |
| 4,160,857 | 7/1979 | Nardella et al. ...................... 429/97 |

*Primary Examiner*—Anthony Skapars
*Attorney, Agent, or Firm*—Oblon, Fisher, Spivak, McClelland & Maier

[57] ABSTRACT

An electric battery has one or more cells in a single container and an outer lid. The container and the outer lid have respective divergent engagement surfaces comprising the lower surface of a ledge on the container and the upper surface of a slot in the lid respectively. Fastening means comprising a channel section clip with divergent limbs is placed in contact with the engagement surfaces and slid in the direction in which they diverge to secure the outer lid firmly to the container.

15 Claims, 5 Drawing Figures

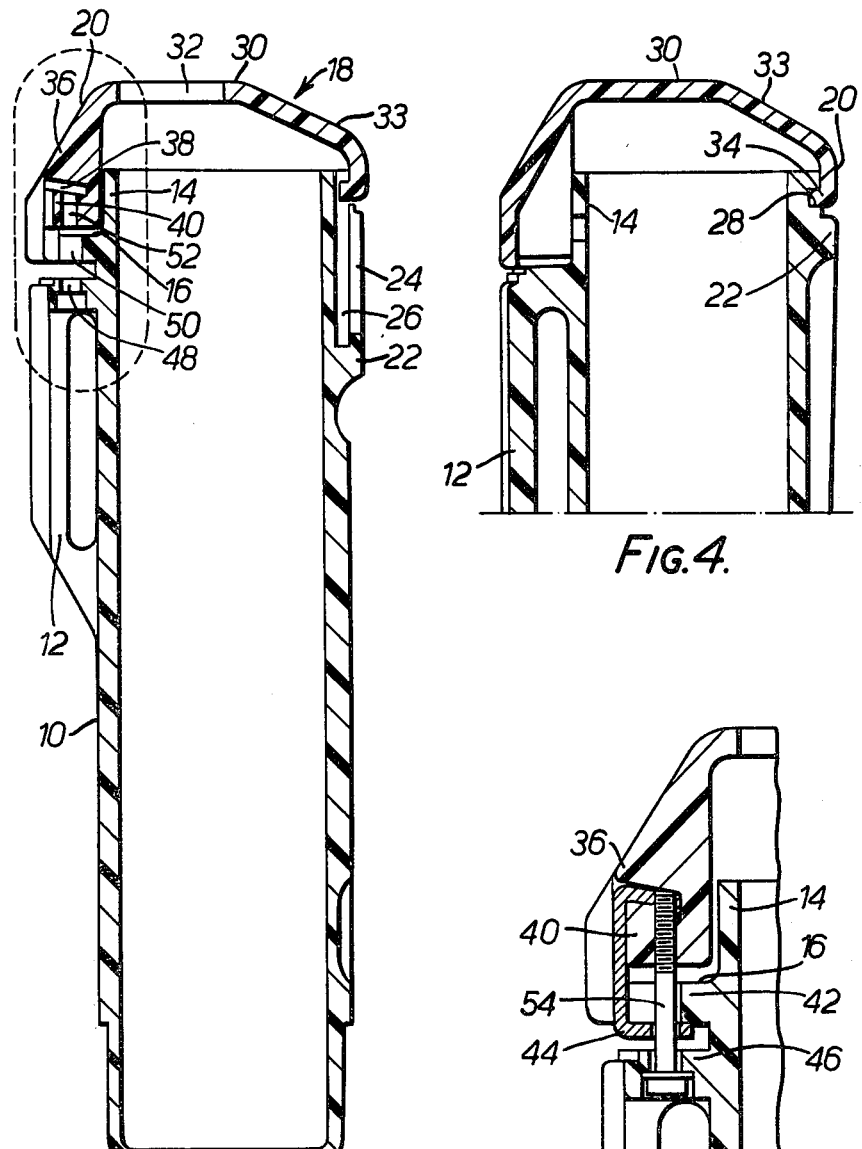
FIG.3.
FIG.4.
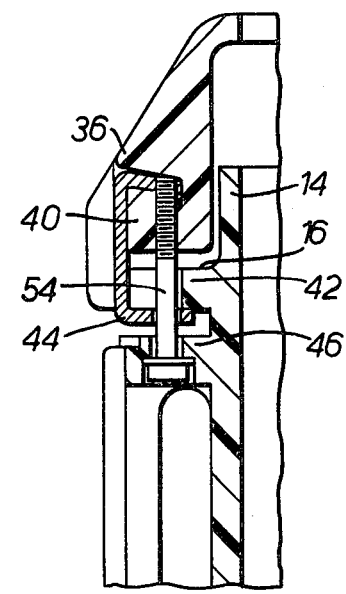
FIG.5.

ELECTRIC BATTERIES

The present invention relates to electric batteries, for example, for use with miners' cap lamps, having an inner lid sealing the or each cell and a further outer lid, and relates in particular to a means of securing the outer lid to the battery container.

According to the present invention there is provided an electric battery in which the cell or cells are accommodated in a single container and having an outer lid, the container and the outer lid having respective engagement surfaces, the battery further including fastening means engaging the two surfaces securing the outer lid to the container.

Preferably, the engagement surfaces are on one side of the battery, whilst on the other side the container has a horizontal groove accommodating an inwardly projecting rib on the lid. In the preferred embodiment at least that side of the container on which the engagement surfaces are situated carries an external shoulder engaged by a depending skirt on the outer lid so that a portion of the container extends up into the upper lid which can therefore only be removed by initially rotating it and then sliding the rib on the lid out of the groove in the container.

The fastening means may comprise a channel section member of which the two limbs engage a respective engagement surface.

Preferably the battery includes locking means adapted to lock the fastening means in position.

The outer lid may therefore be simply and reliably secured to the container by the fastening means which is in turn locked in position, thus making it difficult to remove the outer lid from the container.

Further features and details of the invention will be apparent from the following description of one specific embodiment of a battery for use with a miner's cap lamp which is given by way of example only with reference to the accompanying drawings in which:

FIG. 3 is a sectional elevation on the line 3—3 in FIG. 1;

FIG. 4 is a sectional elevation on the line 4—4 in FIG. 1; and

FIG. 5 is an enlarged view of the circled portion of FIG. 3, showing the channel section fastener and securing screw in position.

Figure 1:
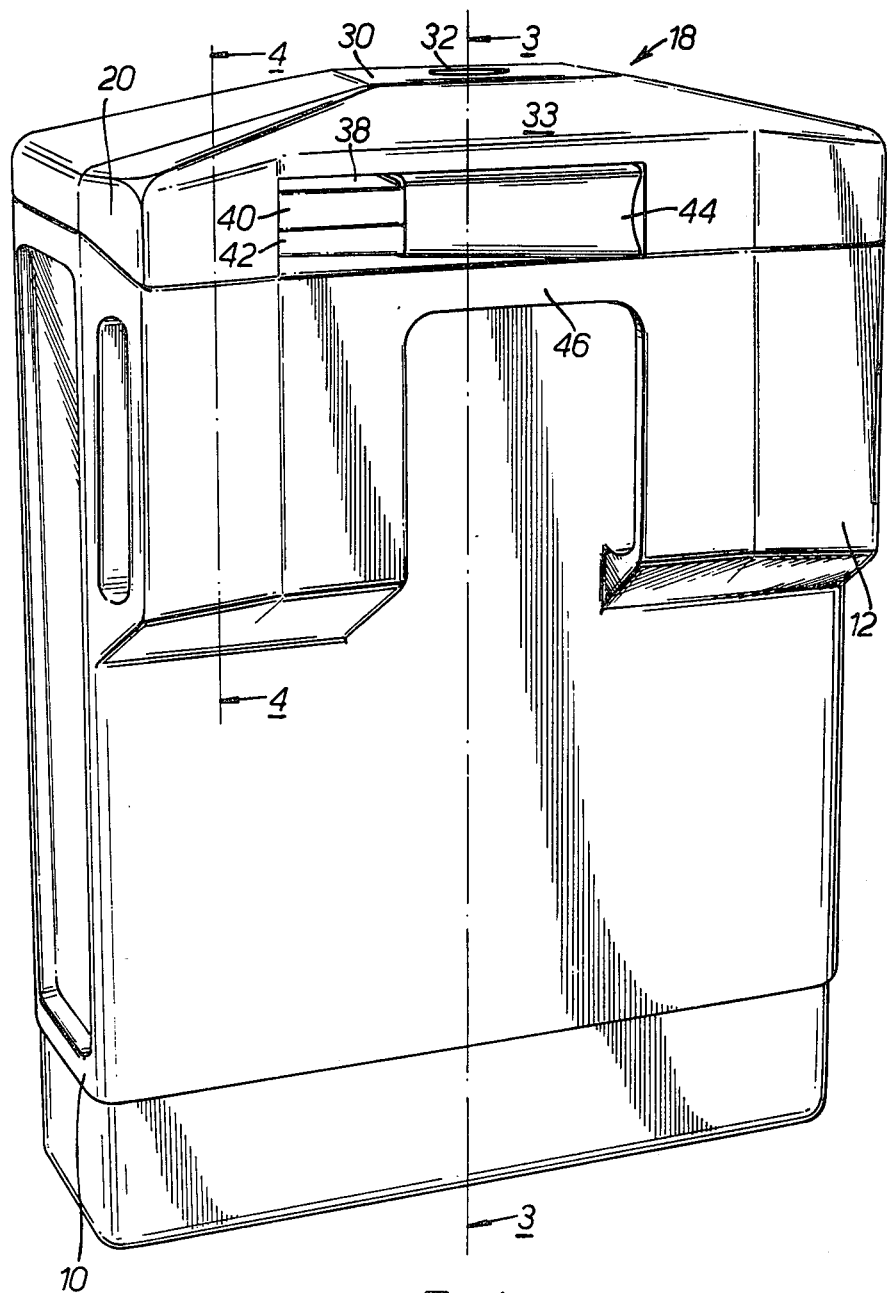
FIG. 1 is a perspective view showing the rear wall of the battery.

As may be seen in FIG. 1 the battery comprises a rectangular section container 10 moulded from polycarbonate material and having on its rear wall two integral belt loops 12, one adjacent each side of the battery, for securing the battery to a miners belt. Within the container there are two individual cells separated from one another by an intercell partition 11 integral with the container and are closed and sealed by a common inner lid 13. Integral with the upper edge of the rear wall and sides of the container is a flange 14 which defines a shoulder 16 on the uppper outer surface of the container. The container is capped with an outer lid 18 having a depending skirt 20 which at its rear edge and side engages the shoulder 16 and lies flush with the outer surfaces of the container.

Figure 2:
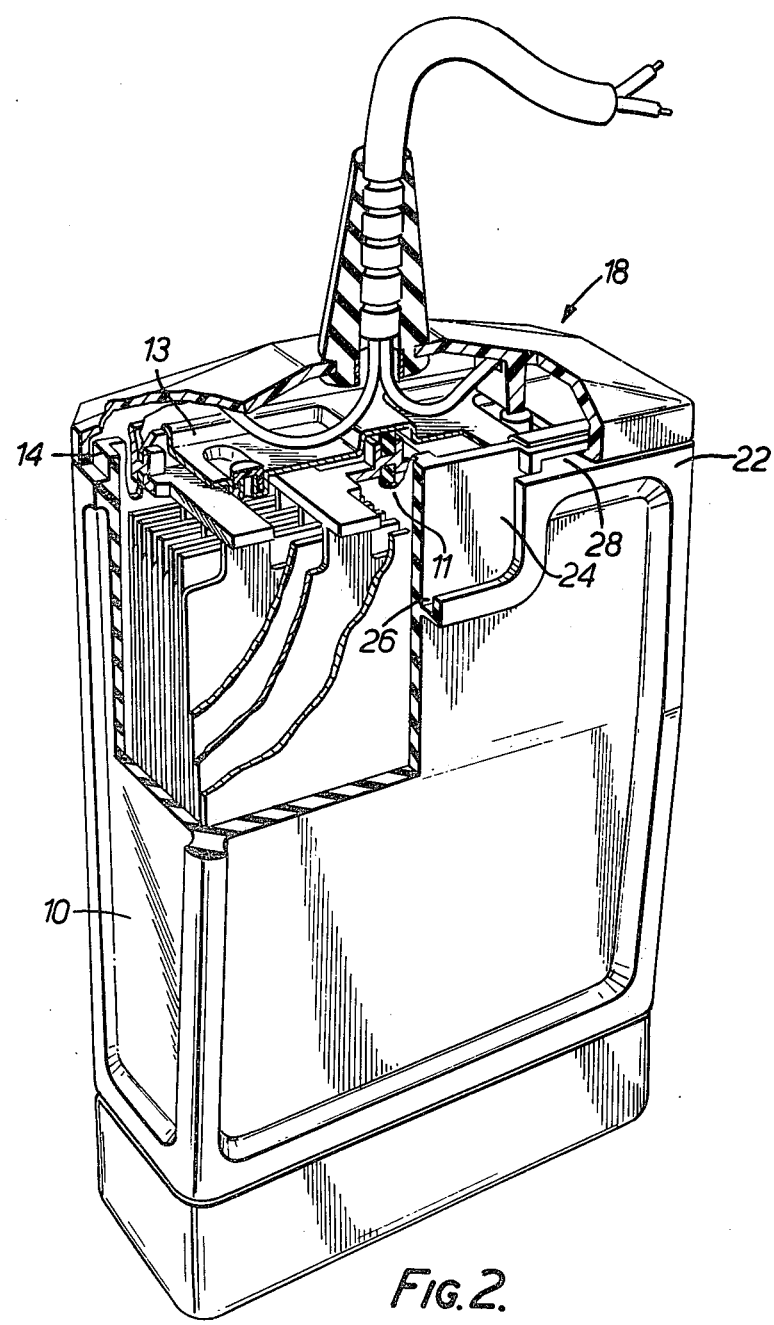
FIG. 2 is a persective view showing the front wall of the battery partly cut away.

The front wall of the battery container carries a thickened portion or rib 22 adjacent its upper edge (seen in FIGS. 2 and 4) and has a rectangular recess 24 at the centre of its upper edge. The rib 22 extends down around the recess, and on both sides and the bottom of the recess defines a groove 26 into which a metal plate bearing symbols identifying the battery may be slid from above. On both sides of the recess 24 the front wall of the container has a horizontal slot 28 immediately above the rib 22, whose function will be described below.

The outer lid 18, which is also moulded of polycarbonate material, has a flat central portion 30 having a central aperture 32 to receive an electrical lead for connecting the battery to a miners cap lamp. Integral with the central portion 30 are four inclined portions 33 sloping downwardly towards the front, rear and two sides of the lid to which the skirt 20 is connected. The skirt at the front edge of the lid 18 has at its lower end an inwardly projecting "knuckle" or rib 34 having a rounded upper edge.

When placing the lid 18 on the container, it is inclined at about 45° and the rib 34 is slid horizontally into the slot 28. The lid is now rotated to the horizontal position in which the skirt overlies the flange 14 and is flush with the outer surface of the container. In this position the lid is firmly anchored to the container at its front edge by the rib 34, and the skirt 20 remains engaged with the flange 14 at its rear edge.

As may be seen in FIG. 3, when the lid 18 is in position the rib 34 passes across the top of the recess 24 in the front wall of the battery covering the top of the groove 26, thus an identifying metal plate that is received in the groove is locked in position, and can only be removed if the lid 18 is removed first.

The skirt at the rear edge of the lid is thickened, as at 36, over about one half of its length, the thickened portion being somewhat offset from the centre of the lid. The thickened portion has a horizontal slot 38 in it, thus providing an outwardly projecting rim or ledge 40 having a substantially horizontal upper surface. Immediately below the upstanding flange 14, the container is also provided with a horizontal rib or ledge 42 directly below the ledge 40. The ledge 42 has a horizontal upper surface but its lower surface is downwardly inclined from left to right as seen in FIG. 1, that is to say the ledge 40 is of increasing thickness. Thus when the lid 18 is in the closed position the lower surface of the upper ledge 40 and the upper surface of the lower ledge 42 are parallel and in contact with one another, whilst the upper surface of the upper ledge and the lower surface of the lower ledge are inclined to another.

The lid 18 is secured to the container at its rear edge by means of a channel section metallic fastener 44, whose limbs engage the upper surface of the ledge 40 and the lower surface of the ledge 42. The limbs of the fastener are inclined to one another at the same angle as the angle of inclination of the upper surface of the ledge 40 and the lower surface of the ledge 42, and the distance between the limbs at their closest point is very slightly greater than the shortest distance between the upper surface of the ledge 40 and the lower surface of the ledge 42, i.e. at their left hand end as seen in FIG. 1. Thus the fastener may simply be pushed over the two ledges at their left hand end and then slid to the right. By virtue of the divergence of the two surfaces this results in the lid being pulled firmly into contact with the container.

In order to ensure that the fastener 44 is not readily removable, and thus that the battery is virtually tamperproof, the fastener can be locked in position. This is achieved by a screw which is screwed upwardly through a bridge 46 connecting the upper portions of the two belt loops 12, and through the limbs of the fastener 44 and the ledges 40 and 42. As may be seen in FIGS. 3 and 5, the bridge 46 is provided with a vertical hole 48 extending up from its lower surface parallel to the rear wall of the battery. The lower ledge 42 has a small central cut-away portion 50 and the upper ledge has a hole 52. The two limbs of the fastener 44 also each have a hole, and these line up with the holes in the ledges 40 and 42 when the fastener 44 is in the locked position shown in FIG. 1.

As shown in FIG. 5, the fastener is locked in position by a screw 54 which passes up through the various holes, its screw thread engaging with the edges of the holes in the fastener.

When the screw 54 is in position the fastener 44 can not be removed from the ledges 40 and 42 and the lid 18 can therefore not be removed.

It will be appreciated that the head of the screw 54 is located on the underside of the bridge 46 very close to the rear wall of the battery and as such is extremely inaccessible, and can only conveniently be undone by a screwdriver having a shaft at least as long as the distance from the bridge 46 to the bottom of the battery.

What we claim as our invention and desire to secure by Letters Patent is:

1. An electric battery having at least one cell, a single container, an inner lid and an outer lid, said container containing said at least one cell and being sealed by said inner lid and also having said outer lid secured thereto, said container and said outer lid each affording on one side of said battery one of a horizontal groove and a projecting rib, said rib being accommodated in said groove, and on the opposite side of said battery a respective substantially horizontal engagement surface, said battery further including fastening means engaging said two engagement surfaces thereby securing said outer lid to said container.

2. A battery as claimed in claim 1 in which the plan area of said outer lid is substantially equal to that of said container.

3. The battery of claims 1 or 2 wherein said projecting rib is on said lid and said groove is on said battery.

4. A battery as claimed in claim 3 in which at least that side of said container on which said two engagement surfaces are situated carries an external shoulder engaged by a depending skirt and said outer lid has a depending skirt, said skirt engaging said shoulder, whereby a portion of said container extends up into said outer lid which can therefore only be removed by initially rotating it and then sliding said rib on said outer lid out of said groove in said container.

5. A battery as claimed in any one of claims 1, 2 or 4 in which said container has a wall and a ledge integral with said wall, the lower surface of said ledge constituting the engagement surface on said container.

6. A battery as claimed in claim 5 in which said ledge on said container is above said external shoulder and projects out from said battery no further than said shoulder.

7. A battery as claimed in claims 1, 2 or 4 in which said outer lid has a thickened portion and a slot formed in said thickened portion, said slot having a lower surface which lower surface constitutes said engagement surface on said outer lid.

8. A battery as claimed in claim 1 in which said fastening means comprises a channel section member having two limbs, said two limbs engaging a respective one of said engagement surfaces.

9. A battery as claimed in claim 8 in which said two engagement surfaces are divergent, and said two limbs of said channel section member are also divergent and adapted to be placed into engagement with said engagement surfaces and then moved in the direction in which the distance between said engagement surfaces increases so as to draw said outer lid into engagement with said container.

10. A battery as claimed in claims 1, 2 or 4 including locking means adapted to lock said fastening means in position.

11. A battery as claimed in claim 8 or claim 9 including locking means adapted to lock said fastening means in position.

12. A battery as claimed in claim 11 in which said locking means comprises a screw threaded member adapted to pass through and lock together at least one of said two limbs of said channel member and one of said two engagement surfaces.

13. A battery as claimed in claim 11 in which said container has a wall, a thickened portion integral with said wall, a ledge integral with said container and a hole adjacent and parallel to said container wall in said thickened portion, said screw threaded member passing up through said hole and through one of said two limbs of said channel member and through said ledge.

14. A battery as claimed in claim 13 including two spaced belt loops integral with said container, said belt loops being connected by a bridge which constitutes said thickened portion of said container wall.

15. A battery as claimed in claims 1, 2 or 4 in which said container has four walls, said four walls of said container having a thickened portion adjacent their upper edge, and said outer lid is substantially flush with the outer surface of said thickened portion.

* * * * *